Patented Aug. 22, 1950

2,519,530

UNITED STATES PATENT OFFICE 2,519,530

BIOTIN ALIPHATIC AMIDES AND METHOD FOR THEIR PREPARATION

Donald E. Wolf, Franklin Township, Somerset County, and Karl Folkers, Plainfield, N. J., assignors to Merck & Co., Inc., Rahway, N. J., a corporation of New Jersey No Drawing. Application June 20, 1947,
Serial No. 756,102

18 Claims. (Cl. 260—309)

This invention is concerned generally with novel chemical compounds and processes of preparing the same. More particularly, it relates to novel biotin derivatives which possess physiological activity as growth promoting factors for microorganisms.

The novel chemical compounds forming the subject matter of the present invention are the biotin aliphatic amines. It has been established with reasonable certainty that these novel compounds have the following structural formula:

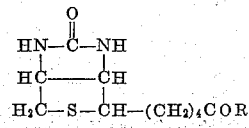

wherein R represents aliphatic amino acids and aliphatic amino acid esters.

It has now been discovered in accordance with the present invention that these new compounds may be prepared by reacting aliphatic amines with compounds represented by the formula:

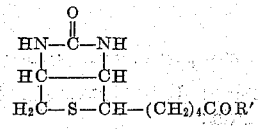

wherein R' represents halogen and alkoxy substituents.

Starting materials wherein R' in the above formula is a halogen substituent are fully defined by the name biotin acid halides and dl-biotin acid halides wherein the carboxyl groups are converted to acid halide groups. These biotin acid halide compounds can be prepared by reacting biotin with phosphorus halides, sulfuryl halides and thionyl halides. This process and the products thereby obtained are fully disclosed and claimed in a copending joint application by the present inventors, Folkers, Mozingo and Wolf, Serial No. 554,460, filed September 16, 1944, now Patent No. 2,442,681.

Compounds of the above formula wherein R represents alkoxy substituents are fully defined by the name biotin alkyl esters and dl-biotin alkyl esters.

The aliphatic amines, which may be employed as reactants in the present invention, include aliphatic amino acids and aliphatic amino acid esters. Compounds such as glycine, and esters of alanine, leucine, aspartic and glutamic acids have been found to be satisfactory.

In carrying out the process of the present invention a biotin acid halide, or a biotin ester is reacted with an aliphatic amine in the presence of a condensing agent such as pyridine or sodium hydroxide. The reaction is preferably conducted at room temperature, for a time sufficient to effect condensation. When sodium hydroxide is employed as the condensing agent, the solution can be acidified with an inorganic acid, such as hydrochloric acid, whereupon the substituted biotin amide crystallizes from solution. Condensing agents such as pyridine are removed by evaporation. The residue thus obtained is a mixture of substituted biotin amide and impurities. The biotin amide can be extracted with chloroform, the extract dried and the chloroform removed by evaporation leaving the biotin amide as a clear oil. When the oil is dissolved in alcohol and the mixture diluted with water, white crystals of substituted biotin amide separate from solution.

The condensation of biotin and aliphatic amino acid esters results in the formation of the biotinyl aliphatic amino acid ester. These esters can be converted to biotinyl aliphatic amino acids by hydrolyzing the ester group. This is accomplished by heating the biotinyl aliphatic amine ester with sodium hydroxide at 60° C., cooling the solution and adding an acid to precipitate the biotinyl aliphatic amino acid.

The following examples illustrate a method of carrying out the present invention but it is to be understood that these examples are given by way of illustration and not of limitation.

*Example 1*

To 24 mg. of biotin was added about 7 drops of thionyl chloride. The biotin dissolved and biotin acid chloride crystallized from solution. The excess thionyl chloride was evaporated in vacuo. To the biotin acid chloride, thus obtained, was added a solution of 76 mg. of glycine in 1 ml. of sodium hydroxide (N) at 0° C. After thirty minutes the solution was acidified with 3 N hydrochloric acid and biotinyl glycine precipitated as a white solid. The crystals, which were removed and recrystallized from water, had a melting point of 213.5–214.5° C.

Anal. Calcd. for $C_{12}H_{19}N_3O_4S$: C, 47.82; H, 6.35. Found: C, 47.95; H, 6.90.

*Example 2*

100 mg. of biotin was converted to the acid chloride by treating it with thionyl chloride. To the biotin acid chloride thus obtained was added .5 ml. of β-alanine ethyl ester. The mixture was allowed to stand at room temperature for eighteen hours. The reaction product was dissolved in about 15 cc. of .5 N hydrochloric acid and the solution extracted continuously with chloroform for two hours. The chloroform was evaporated leaving biotinyl-β-alanine ethyl ester as a white solid melting at 132–135° C.

Anal. Calcd. for $C_{15}H_{25}N_3O_4S$: C, 52.47; H, 7.34; N, 12.24. Found: C, 52.40; H, 7.29; N, 12.81.

To about 100 mg. of biotinyl-β-alanine ethyl ester was added 10 ml. of 0.5 N sodium hydroxide. The mixture was heated at 60° C. for twenty minutes. The solution was cooled and acidified with hydrochloric acid. Biotinyl-β-alanine separated as a white flocculent precipitate and was collected and washed on a filter. The product had a melting point of 229–232° C. Biotinyl-β-alanine was dried at 140° C. for analysis.

Anal. Calcd. for $C_{13}H_{21}N_3O_4S$: C, 49.51; H, 6.71; N, 13.32. Found: C, 49.26; H, 6.43; N, 13.01.

*Example 3*

About 100 mg. of biotin was converted to the acid chloride by treatment with thionyl chloride. To the biotin acid chloride thus obtained was added a solution of 126 mg. of l(−)leucine ethyl ester hydrochloride in about 2 ml. of pyridine. The reaction mixture was allowed to stand at room temperature overnight and then concentrated in vacuo. The residue was dissolved in chloroform and the chloroform washed with dilute acid, bicarbonate, and water. The chloroform solution was dried over magnesium sulfate and concentrated leaving biotinyl-l(−)leucine ethyl ester as a clear oil. When dissolved in ethyl alcohol, and diluted with water white crystals of biotinyl-l(−)leucine ethyl ester formed. These crystals which were recovered and dried, had a melting point of 116° C.

Anal. Calcd. for $C_{18}H_{31}N_3O_4S$: C, 56.08; H, 8.11; N, 10.90. Found: C, 56.09; H, 8.16; N, 10.74.

*Example 4*

100 mg. of biotin was converted to biotin acid chloride by treating it with thionyl chloride. To the biotin acid chloride thus obtained was added a solution of 163 mg. of dl-aspartic diethyl ester in 1 ml. of dry pyridine. The mixture was agitated until the biotin acid chloride had dissolved. The solution was allowed to stand at room temperature for 1½ hours and was then evaporated at reduced pressure resulting in an oil containing ethyl biotinyl-dl-aspartate. The oil was dissolved in chloroform and the chloroform solution washed with dilute acid, bicarbonate, and water. The chloroform solution of ethyl biotinyl-dl-aspartate was dried over magnesium sulfate and the chloroform evaporated. The residue was dissolved in ethanol and diluted with water whereupon ethyl biotinyl-dl-aspartate precipitated as a white solid.

Anal. Calcd. for $C_{18}H_{29}N_3O_6S$: C, 52.03; H, 7.04; N, 10.11. Found: C, 52.10; H, 7.12; N, 10.14.

*Example 5*

94 mg. of biotin was converted to biotin acid chloride by treating it with thionyl chloride. To the biotin acid chloride thus obtained was added a solution of 109 mg. of ethyl l(+)glutamate hydrochloride in 2 ml. of pyridine. After 1½ hours the pyridine was evaporated in vacuo and ethyl biotinyl l(+)glutamate remained as an oil. The oil was dissolved in chloroform, washed successively with dilute acid, bicarbonate, and water. The chloroform solution was dried and evaporated in vacuo leaving ethyl biotinyl l(+)glutamate as a clear oil. White crystalline ethyl biotinyl l(+)glutamate was precipitated by dissolving the oil in chloroform and diluting with ether.

Anal. Calcd. for $C_{19}H_{31}N_3O_6S$: C, 53.13; H, 7.28. Found: C, 52.97; H, 7.22.

Modifications may be made in carrying out the present invention without departing from the spirit and scope thereof and the invention is to be limited only by the appended claims.

We claim:

1. A compound of the structure $$\begin{array}{c} \text{O} \\ \| \\ \text{HN}-\text{C}-\text{NH} \\ | \quad\quad | \\ \text{HC}-\!\!-\!\!-\!\!-\text{CH} \\ | \quad\quad | \\ \text{H}_2\text{C}-\text{S}-\text{CH}-(\text{CH}_2)_4-\text{COR} \end{array}$$

wherein R is a substituted aliphatic amine radical linked to the —CO— group through the amino nitrogen and wherein the only substituents in said amine radical are selected from the class consisting of carboxylic acid and carboxylic acid ester groups.

2. Biotinylglycine having the structural formula $$\begin{array}{c} \text{O} \\ \| \\ \text{HN}-\text{C}-\text{NH} \\ | \quad\quad | \\ \text{HC}-\!\!-\!\!-\!\!-\text{CH} \\ | \quad\quad | \\ \text{H}_2\text{C}-\text{S}-\text{CH}-(\text{CH}_2)_4-\text{CO}-\text{NH}-\text{CH}_2-\text{COOH} \end{array}$$

3. Biotinyl-l(−)leucine ethyl ester having the structural formula $$\begin{array}{c} \text{O} \\ \| \\ \text{HN}-\text{C}-\text{NH} \\ | \quad\quad | \\ \text{HC}-\!\!-\!\!-\!\!-\text{CH} \\ | \quad\quad | \\ \text{H}_2\text{C}-\text{S}-\text{CH}-(\text{CH}_2)_4-\text{CO}-\text{NH}-\text{CH}-\text{CO}_2\text{C}_2\text{H}_5 \\ \quad\quad\quad\quad\quad\quad\quad\quad\quad\quad\quad\quad\quad | \\ \quad\quad\quad\quad\quad\quad\quad\quad\quad\quad\quad\quad\quad \text{CH}_2-\text{CH}(\text{CH}_3)_2 \end{array}$$

4. Biotinyl-β-alanine having the structural formula $$\begin{array}{c} \text{O} \\ \| \\ \text{HN}-\text{C}-\text{NH} \\ | \quad\quad | \\ \text{HC}-\!\!-\!\!-\!\!-\text{CH} \\ | \quad\quad | \\ \text{H}_2\text{C}-\text{S}-\text{CH}-(\text{CH}_2)_4-\text{CO}-\text{NH}-\text{CH}_2-\text{CH}_2-\text{COOH} \end{array}$$

5. Ethyl biotinyl l(+)glutamate having the structural formula:

$$\begin{array}{c} \text{O} \\ \| \\ \text{HN}-\text{C}-\text{NH} \\ | \quad\quad | \\ \text{HC}-\!\!-\!\!-\!\!-\text{CH} \\ | \quad\quad | \\ \text{H}_2\text{C}-\text{S}-\text{CH}-(\text{CH}_2)_4\text{CO}-\text{NH}-\text{CH}-\text{CO}_2\text{C}_2\text{H}_5 \\ \quad\quad\quad\quad\quad\quad\quad\quad\quad\quad\quad\quad\quad | \\ \quad\quad\quad\quad\quad\quad\quad\quad\quad\quad\quad\quad\quad \text{CH}_2-\text{CH}_2-\text{CO}_2\text{C}_2\text{H}_5 \end{array}$$

6. Ethyl biotinyl-dl-aspartate having the structural formula:

$$\begin{array}{c} \text{O} \\ \| \\ \text{HN}-\text{C}-\text{NH} \\ | \quad\quad | \\ \text{HC}-\!\!-\!\!-\!\!-\text{CH} \\ | \quad\quad | \\ \text{H}_2\text{C}-\text{S}-\text{CH}-(\text{CH}_2)_4-\text{CO}-\text{NH}-\text{CH}-\text{COOC}_2\text{H}_5 \\ \quad\quad\quad\quad\quad\quad\quad\quad\quad\quad\quad\quad\quad | \\ \quad\quad\quad\quad\quad\quad\quad\quad\quad\quad\quad\quad\quad \text{CH}_2-\text{COOC}_2\text{H}_5 \end{array}$$

7. The process that comprises condensing a compound selected from the group consisting of aliphatic amino acids and aliphatic amino acid esters with a compound of the formula $$\begin{array}{c} \text{O} \\ \| \\ \text{HN}-\text{C}-\text{NH} \\ | \quad\quad | \\ \text{HC}-\!\!-\!\!-\!\!-\text{CH} \\ | \quad\quad | \\ \text{H}_2\text{C}-\text{S}-\text{CH}-(\text{CH}_2)_4-\text{COR}' \end{array}$$

wherein R' is selected from the class consisting of halogen and alkoxy substituents to form the corresponding biotinyl aliphatic amino compound having the structural formula

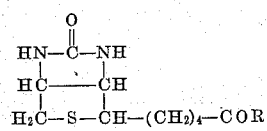

wherein R is a substituted aliphatic amine radical linked to the —CO— group through the amino nitrogen and wherein the only substituents in said amine radical are selected from the class consisting of carboxylic acid and carboxylic acid ester groups.

8. The process that comprises reacting an aliphatic amino acid with a compound of the structure

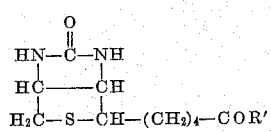

wherein R' is selected from the class consisting of halogen and alkoxy substituents to form the corresponding biotinyl aliphatic amino acid having the formula

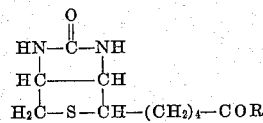

wherein R is a substituted amine radical linked to the —CO— group through the amino nitrogen and wherein the only substituent in said amine radical are carboxylic acid groups.

9. The process that comprises reacting an aliphatic amino acid ester with a compound of the structure

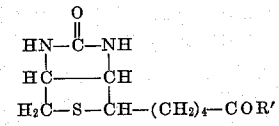

wherein R' is selected from the class consisting of halogen and alkoxy substituents to form the corresponding biotinyl aliphatic amino acid ester having the formula

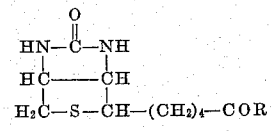

wherein R is a substituted aliphatic amine radical linked to the —CO— group through the amino nitrogen and wherein the only substituent in said amine radical are carboxylic acid ester groups and hydrolyzing the latter compound to the corresponding biotinyl aliphatic amino acid.

10. The process that comprises reacting biotin acid halide with l(—)leucine alkyl ester hydrohalide in the presence of a condensing agent, to form biotinyl-l(—)leucine alkyl ester.

11. The process that comprises reacting biotin acid halide with glycine in the presence of a condensing agent and recovering biotinylglycine.

12. The process that comprises reacting biotin acid halide with β-alanine alkyl ester, recovering biotinyl-β-alanine alkyl ester, and hydrolyzing the latter compound to form biotinyl-β-alanine.

13. The process that comprises reacting biotinyl acid halide with an alkyl l(+)glutamate hydrohalide in the presence of a condensing agent to form alkyl biotinyl l(+)glutamate.

14. The process that comprises reacting biotinyl acid halide with dl-aspartic dialkyl ester in the presence of a condensing agent to form alkyl biotinyl-dl-aspartate.

15. The process that comprises reacting biotin acid chloride with l(—)leucine ethyl ester hydrochloride in pyridine at room temperature for a time sufficient to effect condensation, evaporating the reaction mixture, extracting the residual oil thus obtained with chloroform, washing the chloroform with dilute acid, drying the chloroform, evaporating the reaction mixture, extracting with ethyl alcohol and recovering biotinyl-l(—)leucine ethyl ester from the extract.

16. The process that comprises reacting biotin acid chloride with glycine in sodium hydroxide, and acidifying the solution with hydrochloric acid to precipitate biotinylglycine.

17. The process that comprises reacting biotinyl acid chloride with dl-aspartic diethyl ester in pyridine, evaporating the pyridine, extracting the residual oil thus obtained with chloroform, washing the chloroform extract successively with dilute acid, bicarbonate and water, drying the chloroform extract, evaporating the chloroform, extracting the residue with ethyl alcohol, and adding water to precipitate ethyl biotinyl-dl-aspartate.

18. The process that comprises reacting biotinyl acid chloride with ethyl l(+)glutamate hydrochloride in pyridine, evaporating the pyridine, extracting the residue thus obtained with chloroform, washing the chloroform extract successively with dilute acid, bicarbonate, water, drying the chloroform extract, evaporating chloroform, extracting the residual oil with chloroform and diluting with ether to precipitate ethyl biotinyl l(+)glutamate.

DONALD E. WOLF.
KARL FOLKERS.

No references cited.